(No Model.)

J. H. GARDNER.
COOKER.

No. 460,860. Patented Oct. 6, 1891.

WITNESSES.
Charles Hannigan.
H. E. Carpenter.

INVENTOR.
John H. Gardner.
by Remington & Hendron
Attys.

THE NORRIS PETERS CO., PHOTO-LITHO., WASHINGTON, D. C.

UNITED STATES PATENT OFFICE.

JOHN H. GARDNER, OF PROVIDENCE, RHODE ISLAND.

COOKER.

SPECIFICATION forming part of Letters Patent No. 460,860, dated October 6, 1891.

Application filed January 26, 1891. Serial No. 379,123. (No model.)

*To all whom it may concern:*

Be it known that I, JOHN H. GARDNER, a citizen of the United States, residing at Providence, in the county of Providence and State of Rhode Island, have invented certain new and useful Improvements in Cookers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to portable cooking apparatus adapted to be employed for culinary purposes; and it consists, essentially, in the combination of a suitably-supported water tank or condenser provided with a perforated central vertical flue, a perforated cover for the condenser, arranged to support kettles or other vessels during the cooking operation, a cover adapted to inclose said vessel, thus forming when in use a heated chamber, a supported inner flue arranged to conduct the heated gases upwardly into the cooking-chamber, and a burning lamp or other suitable generator of heat, all as will be more fully hereinafter set forth and claimed.

I am well aware that portable oil and gas stoves are commonly used for culinary purposes, &c. Therefore I make no claim to such, broadly. The object I have in view is to produce a more efficient cooker than heretofore made, and one in which the consumption of fuel is greatly reduced. By means of my improvement the water-tank, &c., automatically performs the functions of a condenser of the steam and vapor. It arrests the gases and odors to a considerable extent, and also serves as a ventilator for the cooking-chamber above.

Another advantage of my invention is that the entire apparatus may be conveniently carried in a box or chest, thus forming a camp outfit. The lamp itself may be used both for cooking and illuminating purposes at the same time, the cooker meanwhile being supported by and extending through an aperture formed in the box.

Figure 1:
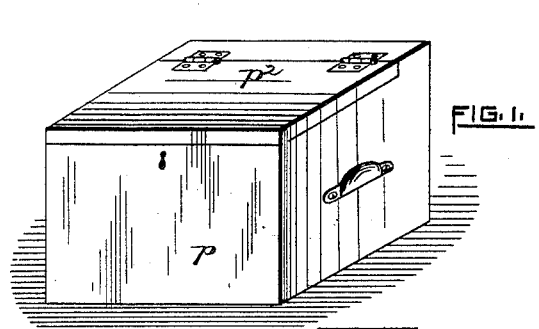
Figure 2:
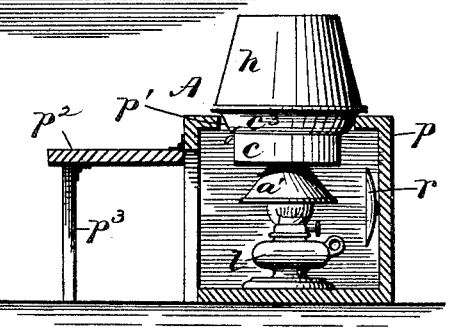
Figure 3:
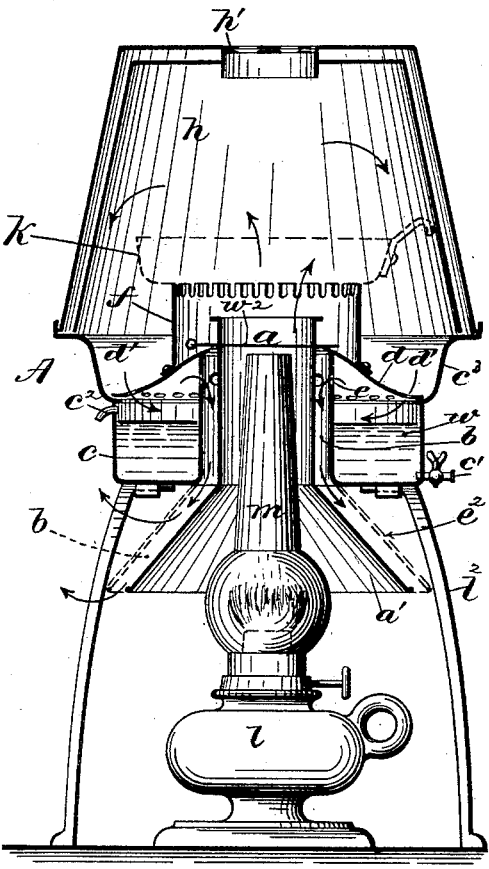
Figure 4:
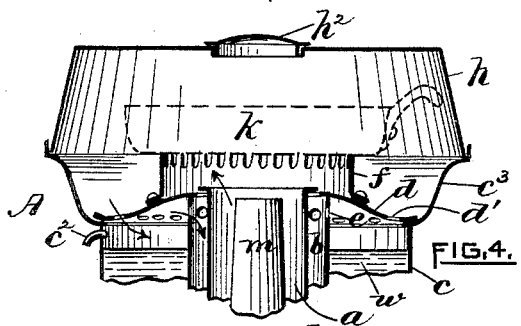
Figure 5:
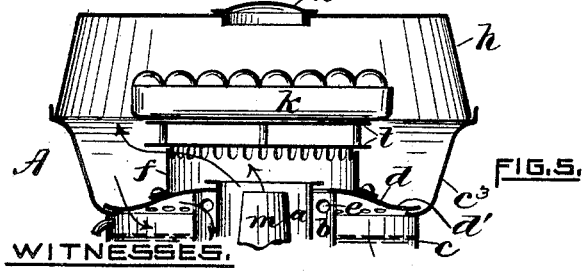
Figure 6:
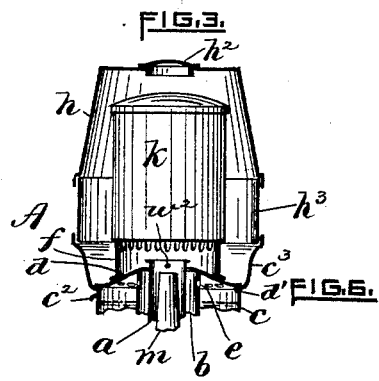

In the appended sheet of drawings, Figure 1 is a perspective view of a box or chest containing the cooking outfit complete. Fig. 2 is a vertical sectional view of the box open, showing the cooker in position as in use. Fig. 3 is an enlarged vertical central sectional view showing the apparatus detached from the box; and Figs. 4, 5, and 6 are similar sectional views of the upper portion of the apparatus, showing slight changes in the manner of constructing and using it.

Again referring to the drawings, A indicates my improved cooker complete, the same consisting, substantially, of a lamp $l$ or other suitable heat-generator, a supported center flue $a$, a supported annular condenser $c$, loosely surrounding the flue, a heating or cooking chamber or cover $h$, resting upon the condenser, and a perforated plate or cover $d$, interposed between the said chamber and condenser. The plate is further provided with legs $f$ or other suitable means for supporting the several vessels or kettles $k$ generally used in culinary operations.

The entire apparatus may be made of sheet metal, as tin, thereby reducing the weight and cost. The center draft-flue $a$ is supported by wires $w^2$ or in any other suitable manner, its upper portion extending through the cover $d$, the opposite or lower portion $a'$ being inclined or funnel-shaped. The flue is made so as to readily receive a glass chimney $m$ of an ordinary oil-lamp $l$. (See Fig. 3.) Surrounding the upper or cylindrical part of the flue $a$ is a tank or condenser $c$, preferably annular in form. The inner or central walls of the condenser extend upwardly and are provided with a series of openings $e$, located above the water level or overflow $c^2$, but below the corresponding end of the center flue. The inner diameter of the condenser exceeds the diameter of the flue $a$, thereby when in use forming an annular space $b$, which I term an "outer" or "return" flue. The outer portion of the condenser extends upwardly in the form of an enlarged circular flange $c^3$, adapted to receive and support the various covers or ovens $h$, soon to be described. The condenser is further provided with a loose annular plate or cover $d$, having inclined sides, its outer edge being perforated, as at $d'$. A faucet $c'$ furnishes means for readily drawing off the water $w$ as it becomes hot, if desired. Removable legs $l^2$ may be employed to support the apparatus when used independently of the chest $p$. To the cover or plate $d$ is attached, as before stated, an open support $f$, having a suitable height. If desired, the walls of the outer flue $b$ may be extended downwardly, as shown by dotted lines $e^2$, Fig. 3. I find, however, that the practical results are substantially the same when it is omitted.

The cooking chamber or oven is produced by the application of the inverted cover $h$. These covers may vary in height, as indicated, and may have single or double walls, the latter being represented in Fig. 3. The covers $h$ are provided with center openings fitted with removable caps $h^2$, or a ventilating-damper $h'$, Fig. 3, may be employed.

For certain purposes, as in boiling meats, vegetables, &c., and requiring a deep vessel $k$, I provide an extension-collar $h^3$. (See Fig. 6.) Again, as in baking bread, &c., I preferably use a deflector $t$, substantially as shown in Fig. 5. This acts to distribute the heat and also prevents the bread from being burned on the bottom.

For camp use the entire outfit may be packed and conveniently carried in a box or chest $p$. In such case I provide one of its sides with an opening $p'$, (being closed when not in use,) through which the condenser $c$ extends and rests. (See Fig. 2.) The hinged cover $p^2$ of the box may be supported by legs or props $p^3$, thereby producing a convenient table. When thus mounted, the light from the burning lamp may be further utilized by means of a reflector $r$ while the lamp is being used for cooking purposes.

The action of the apparatus may be stated, briefly, as follows: Assuming that the several parts are mounted and arranged substantially as represented by Fig. 3, the heat, &c., passes upwardly from the center flue $a$ into the cooking-chamber $h$, the damper $h'$ meanwhile being more or less open, as desired. The heat then passes downwardly through the openings $d'$ (see arrows) into the condenser, thence across the water's surface, through the openings $e$, into the outer or return flue $b$, and escapes below the condenser. The vapor, steam, and odors carried by the heated current of air into the condenser are practically condensed or absorbed by the water. The water also serves to temper the heat in the oven. In case the water becomes too hot, it may be readily drawn off by the faucet $c'$ and replaced by cold water.

By means of my improvement it will be seen that it is practically impossible for water to accidentally come in contact with the heated chimney $m$, either from the cooking-chamber or condenser.

I would state that a burning gas-jet or other equivalent heating means may be employed in lieu of the lamp $l$ without departing from the spirit of my invention.

I claim as my invention—

1. As an improved article of manufacture, a portable cooking apparatus provided with a chimney or central flue, a cooking-oven on top surmounting and communicating with said flue, a water-holding condenser located below and communicating with the cooking-chamber, an outer or return flue located between the central flue and condenser and communicating with the latter through perforations formed in its wall, and a lamp or other suitable generator of heat, all combined and adapted for operation substantially as hereinbefore described.

2. A cooking utensil or apparatus of the class hereinbefore described, having a central flue through which the heat to be utilized passes, an apertured water-holding tank or condenser loosely surrounding said flue and also forming an outer or return flue, and a removable top or cooking chamber surmounting the whole, all constructed and arranged whereby the heated gases, &c., pass upwardly into the cooking-chamber, thence downwardly into the condenser, and over the water's surface into the said return flue, through perforations formed in the condenser-wall, and finally escape into the air, substantially as described.

3. In a cooking apparatus, the combination, with the mounted heating or cooking oven and means for conducting heat thereto, of a condenser arranged below the oven, a perforated cover interposed between the oven and condenser, and an outer flue communicating with the condenser by means of perforations formed in its wall, through which the waste gases, &c., escape from the condenser into the outer air, substantially as hereinbefore described.

4. A cooking apparatus having an apertured water-holding condenser communicating with the cooking-chamber above and interposed between the latter and the outer or exit flue, for the purpose hereinbefore set forth.

5. The cooking apparatus substantially as hereinbefore described, consisting of a central flue, through which the heat first passes, an annular water-holding apertured condenser surrounding said flue, a ventilated oven or cooking-chamber surmounting the condenser and communicating therewith, and a cover interposed between the chamber and condenser, provided with a support for the several vessels or kettles employed in cooking.

In testimony whereof I have affixed my signature in presence of two witnesses.

JOHN H. GARDNER.

Witnesses:
CHARLES HANNIGAN,
GEO. H. REMINGTON.